United States Patent [19]

Goldenberg et al.

[11] Patent Number: 4,950,931
[45] Date of Patent: Aug. 21, 1990

[54] VIBRATOR

[75] Inventors: Michael Goldenberg, Boynton Beach; John M. McKee, Hillsboro Beach, both of Fla.

[73] Assignee: Motorola, Inc., Schaumburg, Ill.

[21] Appl. No.: 297,290

[22] Filed: Jan. 17, 1989

[51] Int. Cl.5 .............................................. H02K 33/06
[52] U.S. Cl. .......................................... 310/36; 310/15
[58] Field of Search ............... 310/15, 36; 340/825.32, 340/825.44

[56] References Cited

FOREIGN PATENT DOCUMENTS 0071168  5/1980  Japan ...................................... 310/36

*Primary Examiner*—Steven L. Stephan
*Assistant Examiner*—Judson H. Jones
*Attorney, Agent, or Firm*—William E. Koch; Vincent B. Ingrassia

[57] ABSTRACT

A vibrator (2) comprising:
a massive, magnetic member (16) arranged for movement about a reference position; and
electromagnetic actuator means (12) for causing said member to move; and
magnetic suspension means (8, 10) arranged on either side of said member for suspending said member therebetween.

7 Claims, 1 Drawing Sheet

VIBRATOR

INTRODUCTION

This invention relates to vibrators and particularly, though not exclusively, to vibrators for use in annunciators. Such vibratory annunciators are known, for example, in paging receivers, where they may be used to announce the receipt of a page to the wearer of the receiver.

A typical such paging receiver employs a vibrator having a magnetic mass located at one end of an arm whose other end is fixed. Such a cantilevered system has a natural frequency of oscillation dependent on the mass and on the stiffness and length of the arm. An electromagnet formed by a coil winding driven by an alternating current (step, ramp or sine) acts on the magnet, causing the system to vibrate. The vibration frequency is chosen to be close to the natural oscillation frequency so as to produce an oscillation of large amplitude.

Such vibrators suffer from the disadvantage that the cantilevered arm is subject to considerable mechanical stress, due to the large amplitudes of vibration needed to produce sufficient tactile sensation. Thus, such vibrators are prone to fatigue failure after only relatively short periods of use.

It is an object of the present invention to provide a vibrator wherein the above mentioned disadvantage may be overcome or at least alleviated.

SUMMARY OF THE INVENTION

In accordance with the present invention, there is provided a vibrator comprising:

a massive, magnetic member arranged for movement about a reference position; and electromagnetic actuator means for causing said member to move; and magnetic suspension means arranged on either side of said member for suspending said member therebetween.

BRIEF DESCRIPTION OF THE DRAWINGS

One vibrator in accordance with the invention will now be described, by way of example only, with reference to the accompanying drawings, in which.

DESCRIPTION OF A PREFERRED EMBODIMENT

Figure 1:
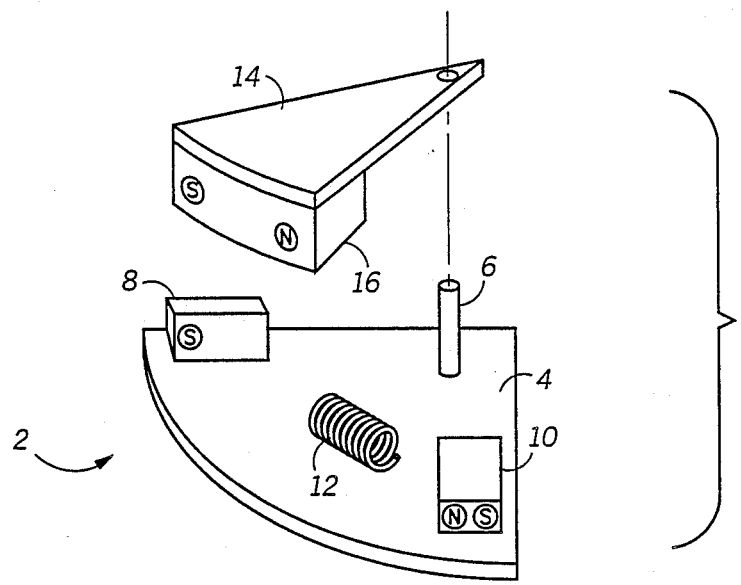
FIG. 1 shows an exploded perspective view of the vibrator.

Referring to FIG. 1, the vibrator 2 includes a flat base plate 4 generally in the form of a 90° circular segment and having a thickness of approximately 0.05" and a radius of approximately 0.6". Adjacent the corner of the base plate in which its two straight sides meet, a cylindrical shaft 6 approximately 0.2" long extends from the top surface of the plate perpendicular to the plane of the plate. Adjacent the two arcuate corners of the plate 6 where are located on the plate's top surface two permanent magnets 8, 10 with opposite polarity magnetic faces arcuately facing. The magnets 8, 10 are made of samarium cobalt and are of the same size: approximately 0.125" high and of rectangular plan cross-section approximately 0.125" in the radial direction and approximately 0.10" in the arcuate direction. A wire wound cylindrical coil 12 approximately 0.2" long and of approximately 0.1" diameter is located approximately in the middle of the top surface of the plate 4, the axis of the shaft being at approximately 45 to each of the straight sides of the plate.

A rotor arm 14 approximately 0.5" long locates at one end via a hole therethrough on the shaft 6 for pivotal motion thereabout. To the end of the rotor arm remote from the shaft 6 is fixed a permanent magnet 16. The magnet 16 is made of samarium cobalt and is approximately 0.125" long in the direction of the length of the arm 14 and of rectangular cross-section normal thereto approximately 0.125" high and approximately 0.2" wide. The rotor arm 14 is mounted on the shaft 6 so that the magnet 16 is near to, but clear of, the top surface of the base plate 4 and is pivotally movable about the axis of the shaft 6 between the magnets 8, 10 in a plane parallel to the plane of the base plate 2. The magnet 16 is arranged with its magnetic faces facing the magnetic faces of the magnets 8, 10 such that faces of like polarity are closest. Thus, in its resting position, the magnet 16 on the rotor arm 14 is suspended between the magnets 8, 10.

In use of the vibrator 2, the coil winding 12 is energized with a stepped driving current of approximately 60 mA at approximately 0.9-1.5 volt and having a 50% duty cycle and a frequency of approximately 50-70 Hz. When the energizing current is applied to the coil 12, the coil performs as an electromagnet and the resulting oscillating magnetic field acts on the magnet 16 to cause it to pivot first toward one of the magnets 8, 10 and then toward the other, thereby setting up a vibratory oscillation of the magnet 16 between its magnetic suspension magnets 8, 10.

It will be appreciated that, unlike in prior art cantilevered vibrators, the restoring forces acting on the magnet 16 are not simply proportional to its displacement from its equilibrium position, but are instead the resultant of the two-oppositely directed repulsive forces between the suspension magnet 16 and the suspension magnets 8, 10 respectively. The result of this is that the amplitude response of the vibrator of FIG. 1 to excitation over a range of frequencies does not exhibit a sharp peak at its natural frequency of oscillation, as is the case with prior art cantilevered vibrators, but instead exhibits a broader optimal response centered around its natural oscillation frequency. Such a broad response allows the vibrator to respond to a range of inputs, for example, pulsed, ramped or varying frequency inputs. Thus, simply by tailoring the electrical input to the coil winding 12, the vibrator can be made to produce a subjectively optimal tactile sensation or pattern of different sensations as desired.

It will also be appreciated that because of the different restoring forces acting on the magnet 16 compared with prior art cantilevered vibrators, the vibrator of FIG. 1 is endowed with a superior inherent damping function.

Despite the improved inherent damping function of the vibrator of FIG. 1, it may still be possible for the magnet 16 to impact one of the magnets 8, 10 if, for example, the vibrator is dropped. If such impact were to occur, the magnets could become damaged since the material from which they are made is brittle and so fractures or shatters easily. In order to protect against this, the magnets 8, 10 & 16 (or at least their opposing faces) may be coated with a layer of cushioning material, e. g. rubber.

Figure 2:
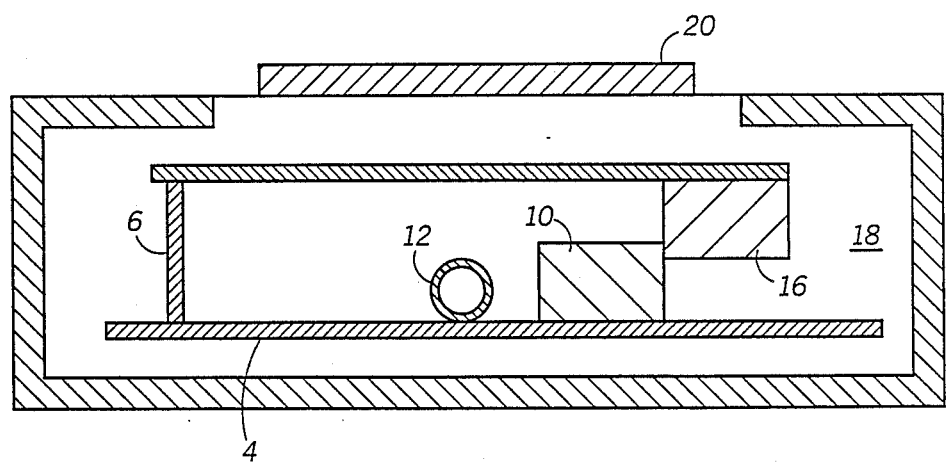
FIG. 2 shows a side cross-sectional view of the vibrator residing in an acoustic cavity of a piezoelectric transducer.

Referring now also to FIG. 2, in view of its small dimensions, the vibrator 2 may be conveniently positioned in the resonant cavity 18 of a piezoelectric acoustic transducer element 20. In this way, separate, independent, optimized mechanisms for acoustic and tactile output can be provided in less space than the sum of the spaces occupied by each mechanism.

It will be appreciated that the low profile, small size and wide response of the vibrator 2 make the vibrator eminently useful in a wide variety of applications, for example, "pen" size or other very small paging receivers, in which their use has heretofore been excluded.

It will be appreciated that the invention has been described above by way of example only and that modifications to the above example may be made without departing from the spirit of the invention.

What is claimed is:

1. A vibrator comprising: a massive, magnetic member arranged for movement about a reference position, said member comprising a first permanent magnet;
   electromagnetic actuator means for causing said member to move, said actuator means comprising an electromagnetic coil; and
   magnetic means arranged on either side of said member for suspending said member therebetween, said magnetic means comprising second and third permanent magnets arranged respectively on either side of said first permanent magnet.

2. A vibrator according to claim 1 further comprising pivot means arranged for restraining said member for pivotal movement about said reference position.

3. A vibrator according to claim 1 wherein said member, said actuator means and said magnetic suspension means are arranged in substantially the same plane.

4. A vibrator according to claim 1 wherein said vibrator is housed in the resonant cavity of a piezoelectric acoustic transducer.

5. A vibrator according to claim 1 further comprising protection means between said member and said suspension means for reducing impact damage therebetween in the event of said vibrator being subjected to mechanical shock.

6. A vibrator according to claim 1 wherein said first, second and third permanent magnets are made of samarium cobalt.

7. A vibrator comprising:
   a magnetic member arranged for movement about an equilibrium position;
   electromagnetic actuator means for causing said member to move; and
   magnetic means arranged on either side of said member for magnetically positioning said member therebetween in the equilibrium position.

* * * * *